Figure 1:
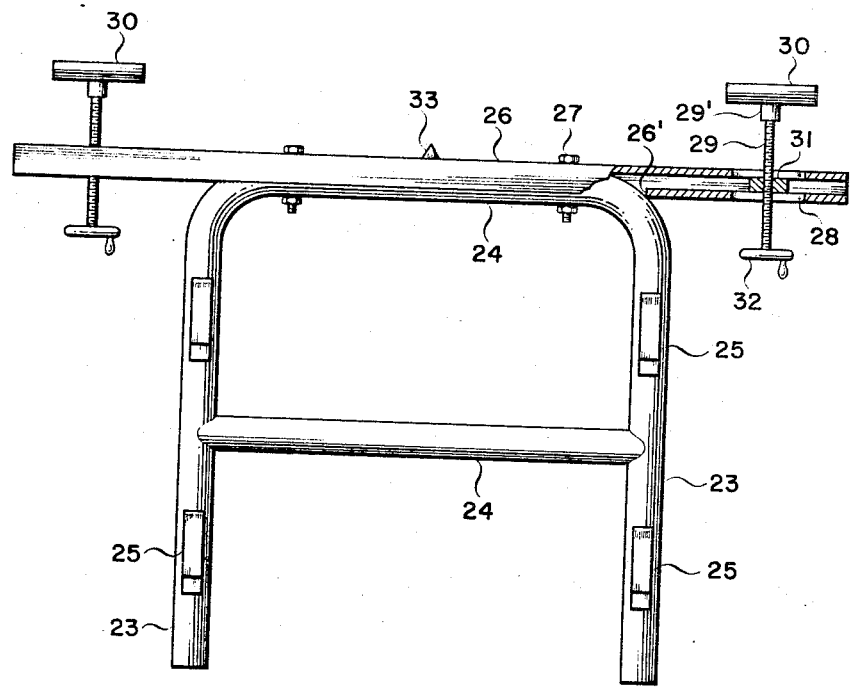

May 9, 1967

C. B. BAXLEY 3,318,466

TOOL FOR REMOVING AND REPLACING COMPONENT
STRUCTURES OF AIRCRAFT

Filed June 16, 1965

2 Sheets-Sheet 1

INVENTOR.
CONWELL B. BAXLEY
BY
George C. Sullivan
Agent

May 9, 1967 C. B. BAXLEY 3,318,466
TOOL FOR REMOVING AND REPLACING COMPONENT
STRUCTURES OF AIRCRAFT
Filed June 16, 1965 2 Sheets-Sheet 2

INVENTOR.
CONWELL B. BAXLEY
BY
George C. Sullivan
Agent

United States Patent Office 3,318,466
Patented May 9, 1967

3,318,466
TOOL FOR REMOVING AND REPLACING COMPONENT STRUCTURES OF AIRCRAFT
Conwell B. Baxley, Douglasville, Ga., assignor to Lockheed Aircraft Corporation, Burbank, Calif.
Filed June 16, 1965, Ser. No. 464,488
2 Claims. (Cl. 214—1)

This invention relates to improvements in tools facilitating the handling of heavy and bulky structures and more particularly to such a tool useful in removing and replacing without misalignment, component structures of aircraft while servicing, repairing and replacing internal parts and mechanisms.

Removable closures are provided on aircraft and the major components thereof to permit access to internal parts and mechanisms which must be regularly serviced, maintained and/or replaced. In the larger, present-day aircraft these closures are massive, in some instances extending several feet in each dimension and weighing several hundred pounds. At the same time the shape of these closures is irregular since they must be made to conform to the external surface of the aircraft or aircraft component so as not to detract from the aerodynamic performance thereof when installed and secured in position. For the same reason the overall dimensions of these closures must conform within very close tolerances to the defining aircraft structure.

Multiple connectors removably secure such closures to the aircraft through coacting elements carried thereby which must align or register during the installation. Since it is not always necessary to completely remove the closure, for example in the case of minor service to the internal parts and mechanisms, the connectors associated with the upper edge of the closure are usually hinged to permit access by merely releasing the other connectors and swinging the closure outwardly of the aircraft.

For major service, repair, etc., however, complete removal of the closure is required. In this case, when the hinged connectors are to be released, two and sometimes three or more men are required to remove a single closure and subsequently reinstall it. In the process, considerable care must be exercised lest the closure is damaged preventing its proper reinstallation due to misalignment of the coacting connector elements; or adversely affecting the aerodynamics of the aircraft due to a marred external surface.

Heretofore, cranes and similar heavy equipment have been employed in the removal and replacement of these closures in which case movement of the closure has been controlled by workmen requiring considerable coordinated effort in balancing, manipulating, aligning, etc., the structure. At best this is a time-consuming operation and exposes the individuals to personal danger. More often than not the closure and/or the defining structure of the aircraft is damaged because of the difficulty in alignment of the connectors and the close fit of the closure to its surrounding structure when installed.

The present invention is addressed to the above problems and proposes a tool adapted for coaction with a rollable workstand or dolly whereby it engages the closure to be removed and secures it to the workstand during and after its removal from the aircraft in a stationary position ensuring its expeditious replacement thereafter. Thus, the closure is subjected to a minimum of handling and may be removed and replaced by one man in appreciably less time than heretofore possible by one or more men. At the same time this tool is of simple, inexpensive construction and is readily portable.

Rollable workstands are usually available, being commonly employed in and around aircraft maintenance areas serving among other things as ladders or scaffolds for workmen and for this reason are vertically adjustable. The present tool includes engagements to secure it to such a workstand along a predetermined length thereof in an upright position where it constitutes, in effect, an integral extension. With the several connectors released the enclosure is swung outwardly of the aircraft on its hinges and its lower edge placed on the upper surface of the workstand, which has been brought into position thereunder.

At its upper end this tool is provided with a central index to locate its position relative to the closure to be supported thereby to ensure a proper distribution of weight and terminates in adjustable plane-establishing supports for contact with the closure thus disposed adjacent its upper edge. When the hinge pins are released, the weight of the closure in the vertical direction is borne by the workstand and its lateral weight is distributed uniformly over the length of the tool whereby its position with respect to its hinged connectors and their coacting elements on the aircraft is maintained. The closure may thereafter be removed from the immediate area on the rollable workstand and returned thereto later with the hinged connectors in position for immediate reconnection to their coacting elements on the aircraft.

Figure 2:
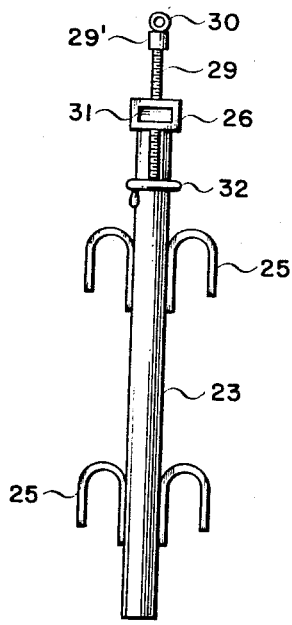
Figure 3:
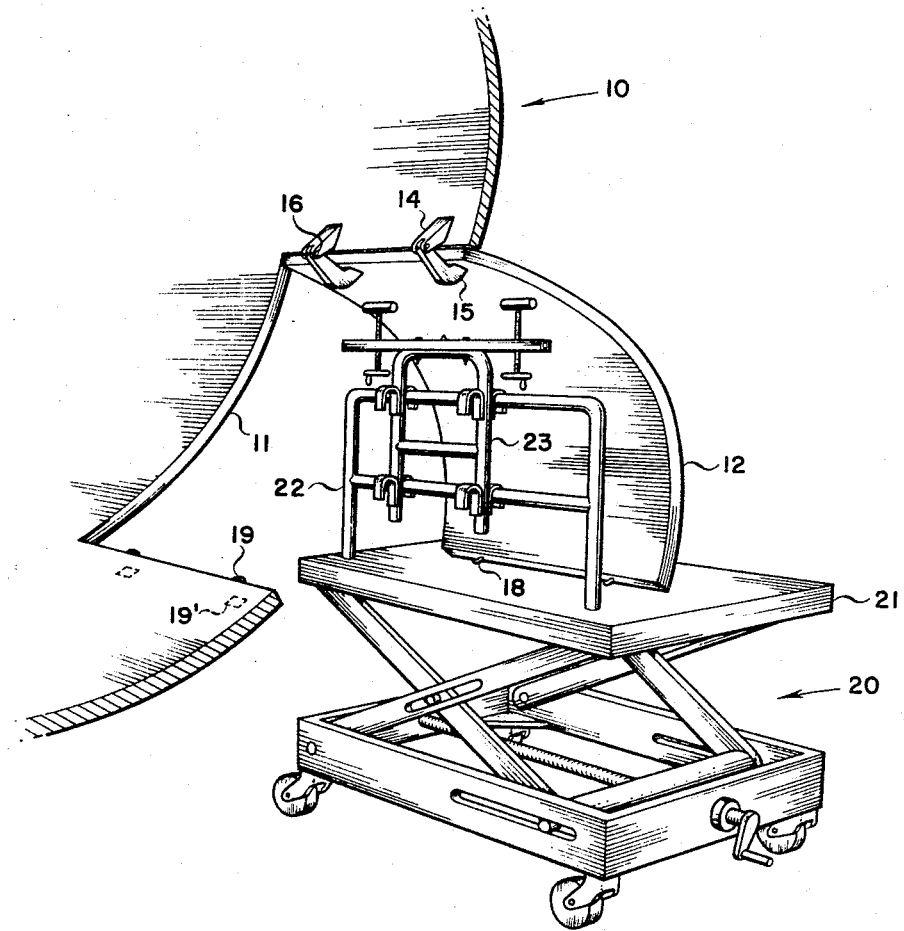

With the above and other objects in view as will be apparent, this invention consists in the construction, combination and arrangement of parts all as hereinafter more fully described, claimed and illustrated in the accompanying drawings wherein:

FIGURE 1 is a side view of a tool constructed in accordance with the teachings of the invention;
FIGURE 2 is an end view thereof; and
FIGURE 3 is a perspective view of the tool shown in FIGURES 1 and 2 secured to a rollable workstand in position adjacent a fragment of an aircraft underlying a closure thereof after all the connectors have been released and the closure swung outwardly on its hinges to show the position thereof immediately prior to a release of the hinge pins whereby the closure is supported in a stationary position on the workstand.

Referring more particularly to the drawings, 10 designates a portion of a component such as the fuselage or nacelle of an aircraft having an access opening 11 therein to permit servicing repairing, etc., to the engine mounted internally of the component 10. A closure 12 having a shape and area conforming to that of the opening 11 is removably secured to the component 10 through one or more hinge connections along the upper edge thereof and the adjacent component structure. Each such connection is formed by clevis 14 carried by the component 10 and a coacting projection 15 on the closure 12 each pierced by openings which align and through which a pin or bolt 16 passes.

Along the opposite or lower edge of the closure 12 is a plurality of releasable connectors each formed by a latch 18 projecting from the closure 12 adapted to releasably engage a coacting catch 19 on structure of the component 10 adjacent the opening 11. An opening 19' is provided in the wall of the component 10 to permit access to the latch mechanism for actuation thereof. The closure 12 is thereby normally secured to the component 10 to constitute an integral part thereof overlying and enclosing the opening 11 therein. When thus disposed the opposed surfaces of the closure 12 conform to the respective external and internal surfaces of the component 10. The mounting of the several hinge connections 14, 15 and connectors 18, 19 is such that they are disposed internally of the component 10 when the closure 12 overlies the opening 11.

When it is desired to remove the closure 12 from the component 10, the several latches 18 are released and the closure 12 is swung outwardly of the component 10 on its hinge connections 14, 15. A rollable workstand 20 is brought into position adjacent the component 10 with its upper surface or platform 21 underlying the lower edge of the closure 12. This workstand 20 is vertically adjustable and may be extended or raised until it abuts the lower edge of the closure 12 when swung outwardly of the component 10 on its hinges 14, 15.

Along its side nearest the component 10, the workstand 20 is provided with a guard railing 22 to which the present tool is adapted to be secured. This tool preferably is fabricated of tubular metal formed with substantially parallel, rigid members 23 interconnected by similarly fabricated crosspieces 24 to ensure its structural integrity. Fixedly secured to and projecting from opposite sides of each member 23 is a mounting element in the form of a hanger-strap 25. The straps 25 of each parallel member are spaced one from another a distance equal to that of the longitudinal bars of the railing 22 with corresponding straps 25 of the several members 23 aligned. Thus, all of the straps 25 on each side of the tool serve as localized engagement means for concurrent coaction with the several bars of the railing 22 whereby the tool is immovably secured thereto. The location of the several straps 25 on both sides of the tool permits its mounting to either side of the railing 22.

The interconnecting crosspiece 24 at the upper end of the members 23 carries a rigid support 26, the upper surface of which defines a predetermined reference plane. Preferably this support 26 is tubular and rectangular in section to ensure its rigidity with a good strength-to-weight ratio. It is slotted centraly, as at 26′, to receive the associated crosspiece 24 which is secured in a fixed position thereto by means of and through a plurality of bolts 27.

The opposite ends of the support 26 extend beyond the ultimate members 23 and are each slotted as at 28 for the passage therethrough of an adjustable vertical extension in the form of a threaded bolt 29. Each bolt 29 terminates outwardly in a structure engaging member preferably a laterally disposed tube 30 being connected thereto through a swivel joint 29′ to permit free and unrestricted relative rotation therebetween. Each bolt 29 passes through a coacting nut 31 mounted against rotation with the respective ends of the support 26 and terminates at its lower end in a rotary handle or key 32. Thus, the position of each tube 30 may be adjusted relative to the reference plane as well as linearly of the support 26 through the associated slot 28.

Centrally the support 26 is provided with an upstanding projection 33 which may be integrally formed thereon and which constitutes an index point for alignment with a predetermined location in the area of the closure 12 to be supported to ensure the ultimate proper distribution of its weight.

In view of the foregoing construction, when the closure 12 is swung outwardly of the component 10 and the platform 21 of the workstand 20 raised to abut the lower edge thereof, the position of the tool is adjusted on the railing 22 to locate the index 33 precisely at the center of the closure 12 with respect to its weight distribution. The bolts 29 are now raised to place their respective tubes 30 in contact with the adjacent surface of the closure 12 so that the pin 16 can be removed to totally separate the closure 12 from the component 10 without any shift in its position. When the workstand 20 is thereafter rolled laterally away from the component 10, the projections 15 pass free of their respective clevises 14.

With the closure 12 now removed, free and unobstructed access is had to the interior of the component 10 through the opening 11. Thereafter the workstand 20 is returned to a position adjacent the component 10 may be rolled laterally to dispose the projections 15 adjacent their clevises 14 with the openings therein aligned. The pin 16 is replaced and the closure 12 is again connected to the component 10 permitting the workstand to be removed.

It is to be understood that the foregoing disclosure is directed to a preferred embodiment of the invention for purposes of clarity and understanding. Numerous modifications or alterations may be made in the structural details of this tool without departing from the spirit and scope of the invention which is to be limited only by the appended claims.

What is claimed is:

1. The combination with a rollable workstand having a vertically adjustable platform and an upstanding railing along one side thereof, of a tool adapted for cooperation with said workstand in the removal and replacement of component structures of aircraft comprising a plurality of parallelly disposed rigid members interconnected by at least one rigid crosspiece, engagements carried by each said member and projecting therefrom at right angles to each said crosspiece, said engagements of each said member being in spaced relation one to another for coaction with complemental means carried by said railing whereby said members are secured to said workstand in an upright position, a support fixedly secured to the upper corresponding ends of said members, a vertically and horizontally adustable extension adapted to contact a component structure to be removed and replaced from the aircraft mounted on said support adjacent each of its ends, and an upright projection on said support locating the center of weight distribution thereon whereby said component structure may be positioned with reference thereto.

2. The combination of claim 1 wherein each said extension is mounted on said support for relatively, linear movement.

References Cited by the Examiner
UNITED STATES PATENTS

| | | | |
|---|---|---|---|
| 2,459,621 | 1/1949 | Cobb | 182—129 X |
| 2,508,661 | 5/1950 | Campbell | 214—390 |
| 2,781,920 | 2/1957 | Burington | 214—1 |
| 2,827,690 | 3/1958 | Brown | 269—17 |
| 2,829,863 | 4/1958 | Gibson | 214—1 X |
| 2,879,059 | 3/1959 | Sanderfur | 269—17 |
| 3,061,041 | 10/1962 | Taylor | 132—129 |

FOREIGN PATENTS 629,851  9/1949  Great Britain.

References Cited by the Applicant
UNITED STATES PATENTS 2,924,418  2/1960  Nolan et al.
3,030,103  4/1962  Allen et al.

MARVIN A. CHAMPION, *Primary Examiner.*